(No Model.)

G. A. MARSH, Jr.
TABLE FOR HOLDING PLATE GLASS.

No. 477,306. Patented June 21, 1892.

George A. Marsh, Jr.,
Inventor

Witnesses

UNITED STATES PATENT OFFICE.

GEORGE A. MARSH, JR., OF SANDUSKY, OHIO.

TABLE FOR HOLDING PLATE-GLASS.

SPECIFICATION forming part of Letters Patent No. 477,306, dated June 21, 1892.

Application filed September 30, 1891. Serial No. 407,346. (No model.)

*To all whom it may concern:*

Be it known that I, GEORGE A. MARSH, Jr., a citizen of the United States of America, residing at Sandusky, in the county of Erie and State of Ohio, have invented certain new and useful Improvements in Tables for Holding Plate-Glass; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in tables or supports for plate-glass, such as are used in grinding or polishing the plates of glass which are placed or held upon the table; and the invention consists in providing a table or section thereof with an upper surface, upon which the packing and plate-glass are adapted to rest and be retained thereon by a vacuum formed in the chamber beneath the plate or plates of glass and the top of the table, said top being provided with a number of hollow supports or stays upon which the packing and glass are adapted to rest, said stays and the circumferential water-channel being connected with a chamber which is adapted to receive a liquid supply, beneath which is located a vacuum-chamber connected by a suitable aperture to the table-top, as will hereinafter more fully appear.

Figure 1:
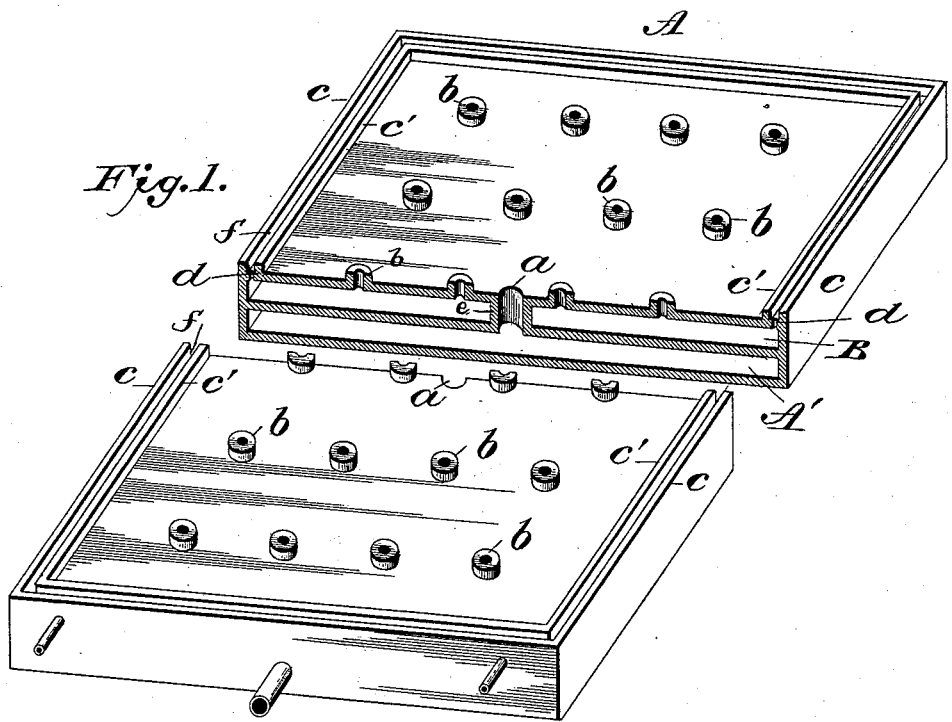
Figure 2:
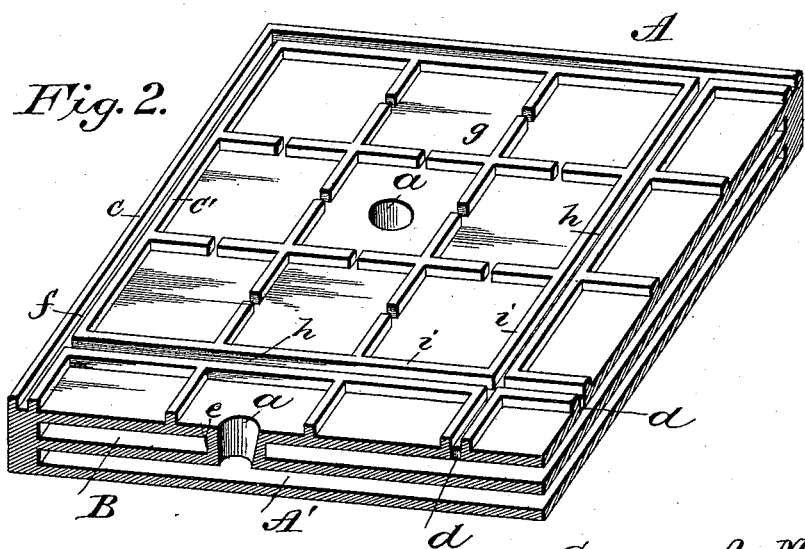

In the accompanying drawings, forming a part of this specification, Figure 1 is a perspective view, partly in section, showing a section of a glass grinding or polishing table constructed in accordance with my invention. Fig. 2 is a perspective sectional view of a modification.

A designates a table or section thereof, which is formed or constructed so as to be provided with two chambers A' and B. The lower chamber A' is what I term the "vacuum-chamber," and is connected in any suitable manner to an air-exhaust mechanism. This chamber is connected by an aperture or apertures $a$ to the table-top A, said aperture or apertures being disconnected from the chamber B by a wall $e$, which surrounds the aperture $a$, as shown. The chamber B is connected with a liquid-supply, preferably water, which serves when circulated therein not only as a cooling medium to absorb any heat which may be generated in the glass during the process of grinding or polishing, but also provides a means for supplying water to the packing which is placed over the table and upon which the glass directly rests, said packing being preferably of an absorbent nature.

The top of the table A is provided, Fig. 1, with a series or number of hollow stays or supports $b$, which connect with the chamber B, the height of these supports being the same as the raised walls $c$ and $c'$, which surround the table or section thereof. The channel $f$, between the marginal walls $c$ and $c'$, is connected by apertures $d$ at suitable intervals with the chamber B.

In Fig. 2 of the drawings I have shown a table constructed substantially as shown in Fig. 1; but in this case the hollow supports connecting with the cooling-chamber are dispensed with and solid supports $g$ and $i$ and water-channels $h$ are provided, as shown. In this modification the top of the table is preferably made up of a number of sections which are divided by the raised walls $i\ i$, between which are water-channels $h$, connecting with the chamber B.

In the construction shown, instead of providing a multiplicity of vacuum-cells of practically small area, larger vacuum-cells are provided, and the supports $g$ and $i$ prevent the glass being bent by atmospheric pressure or the exhaustion of the air under the plate of glass. The supports $g$ have apertures or recesses between them, through which the air can pass from one to the other, so that the air can be exhausted through the aperture $a$ from beneath the glass.

In operation a suitable packing is laid over the top of the table, either in a sheet or pieces of sufficient size to cover the water-channels, and small pieces are placed on top of the stays or supports. The glass is then laid upon the table in any suitable manner and water admitted to the cooling-chamber, which passes therefrom to the water-channels. The air is then exhausted from the chamber A', and being drawn through the air-passage $a$ forms a vacuum beneath the glass, which will hold it in place while being ground or polished. The cooling-chamber beneath the top of the table not only serves as a means for keeping the packing moist, so that the vacuum can be produced beneath the glass plate, but also serves as the water circulates therein to absorb heat that may be generated in the process of grinding or polishing the glass. By this construction I am enabled to dispense with a multiplicity of vacuum-cells in close proximity to each other and can hold the plates of glass upon the table by employing comparatively large cells, the glass being prevented from being bent by the stays which extend from the top of the table upward to the same height as the marginal walls of said table.

I do not claim in this specification a table for polishing or grinding plate-glass having a surface made up of vacuum-cells which are connected to an air-chamber located beneath the table-top and a chamber between the air-chamber and table-top in which is circulated a cooling medium, nor in combination with such elements a multiplicity of independent cells each connected with an air-exhaust mechanism, nor vacuum-cells each having marginal walls and a table with a raised circumferential wall, as such form the subject-matter of claims in an application filed by me September 7, 1891, which bears Serial No. 405,010.

What I claim, and desire to secure by Letters Patent, is—

1. In a glass polishing or grinding table, a top having raised marginal walls adapted to support a packing, the channel between said walls communicating with the liquid-supply, central stays or supports extending upwardly from the top of the table, and an air-passage connecting with a vacuum-chamber, substantially as set forth.

2. In a glass grinding or polishing table, a top having raised walls forming water-channels which are connected by apertures with a liquid-chamber B, supports extending from the top of the table to the same level as the walls forming the water-channels, and an aperture connecting the top or section thereof with a vacuum-chamber by an air-passage which passes through the liquid-chamber, substantially as set forth.

3. The combination, in a glass grinding or polishing table constructed substantially as shown and provided with raised marginal walls connecting with a liquid-supply, of hollow supports, also connected with the water-supply, and a vacuum-chamber communicating with the section or table top bounded by the walls, substantially as set forth.

In testimony whereof I affix my signature in the presence of two witnesses.

GEORGE A. MARSH, JR.

Witnesses:
CHARLES W. SADLER,
THOMAS WOOD.